(12) United States Patent
Arakawa

(10) Patent No.: US 7,447,887 B2
(45) Date of Patent: Nov. 4, 2008

(54) MULTITHREAD PROCESSOR

(75) Inventor: Fumio Arakawa, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 264 days.

(21) Appl. No.: 11/482,073

(22) Filed: Jul. 7, 2006

(65) Prior Publication Data
US 2007/0088934 A1 Apr. 19, 2007

(30) Foreign Application Priority Data
Oct. 14, 2005 (JP) ............... 2005-300121

(51) Int. Cl.
G06F 9/38 (2006.01)
(52) U.S. Cl. ................ 712/241; 712/215
(58) Field of Classification Search .......... 712/215, 712/241
See application file for complete search history.

(56) References Cited

U.S. PATENT DOCUMENTS 6,105,127 A  8/2000  Kimura et al.
6,253,313 B1 *  6/2001  Morrison et al. ............ 712/226
6,976,150 B1 * 12/2005  Uht et al. ..................... 712/18
2004/0216106 A1 10/2004  Kalla et al.

FOREIGN PATENT DOCUMENTS

JP   10-124316 A   5/1998
JP   2004-326766 A   11/2004

* cited by examiner

Primary Examiner—William M Treat
(74) Attorney, Agent, or Firm—Miles & Stockbridge P.C.

(57) ABSTRACT

To guarantee response time while strictly maintaining the priority specified by software, a processor (1) which is a multithread processor having a thread multiplexer (10), and an issue information buffer (ISINF). An instruction code, and issue information (isid) for instructions issued at and after the next operating cycle which is added to the instruction code, are supplied to the thread multiplexer. The issue information is valid from the second and subsequent instruction flows, and is saved temporarily in an issue information buffer. This issue information is for example the position of an operating cycle which can issue a high priority instruction, i.e., information showing a slot. The thread multiplexer issues a low priority instruction at another operating cycle at which a high priority instruction is not issued according to the issue information.

5 Claims, 15 Drawing Sheets

EXECUTION EXAMPLE OF TIME-DIVISION MULTITHREAD PROCESSOR

|   | 1ST SLOT | 2ND SLOT |   | ISSUE INFORMATION |
|---|---|---|---|---|
| 1. | mov @r0+, r4 | dt r3 |   | 0 |
| 2. | mov @r1+, r5 | ~~add r4, r5~~ |   | 0 |
| 3. | ~~add r4, r5~~ | ~~bf/s _L00~~ |   | 0 |
| 4. | add r4, r5 | ~~bf/s _L00~~ |   | 0 |
| 5. | bf/s _L00 | mov r5, @(r0+r2) |   | 0 |
| 6. | ~~NT #1~~ | ~~NT #2~~ |   | 0 |
| 1. | mov @r0+, r4 | dt r3 |   | 0 |
| 2. | mov @r1+, r5 | ~~add r4, r5~~ |   | 1 |
| 3. | mov @r0, r4 | dt r2 | 1. | 0 |
| 4. | add r4, r5 | ~~bf/s _L00~~ | 2. | 0 |
| 5. | bf/s _L00 | mov r5, @(r0+r2) | 3. | 1 |
| 6. | bf/s _L01 | ~~add r4, r3~~ | 4. | 0 |
| 1. | mov @r0+, r4 | ~~mov @r1+, r5~~ | 5. | 0 |
| 2. | mov @r1+, r5 | dt r3 | 6. | 1 |
| 3. | mov r4, r3 | ~~mov r3, @r1~~ | 7. | 0 |
| 4. | add r4, r5 | ~~bf/s _L00~~ | 8. | 0 |
| 5. | bf/s _L00 | mov r5, @(r0+r2) | 9. | 1 |
| 6. | mov @r0, r4 | dt r2 | 1. | 0 |

PRIOR ART
FIG. 1

FIRST PROGRAM

C PROGRAM

```
for(i=0;i<N;i++)
c[i]=a[i]+b[i];
```

ASSEMBLER PROGRAM

```
        mov #_a,r0
        mov #_b,r1
        mov #(_c-_a),r2
        mov #N,r3
_L00:   mov @r0+,r4
        mov @r1+,r5
        dt r3
        add r4,r5
        bf/s _L00
        mov r5,@(r0+r2)
```

OPTIMIZATION FOR SUPERSCALAR

```
        mov #_a,r0
        mov #_b,r1
        mov #(_c-_a),r2
        mov #N,r3
        mov @r0+,r4
        dt r3
        mov @r1+,r5
        add r4,r5
        bf/s _L00
        mov r5,@(r0+r2)
```

PRIOR ART
FIG. 2

EXAMPLE OF THE LOOP EXECUTION

|   | |
|---|---|
| 1. | mov @r0+, r4 |
| 2. | mov @r1+, r5 |
| 3. | dt r3 |
| 4. | add r4, r5 |
| 5. | bf/s _L00 |
| 6. | mov r5, @(r0+r2) |

SCALAR PROCESSOR

|   | 1ST SLOT | 2ND SLOT |
|---|---|---|
| 1. | mov @r0, r4 | dt r3 |
| 2. | mov @r1, r5 | |
| 3. | | |
| 4. | add r4, r5 | |
| 5. | bf/s _L00 | mov r5,@(r0+r2) |
| 6. | | |

2-WAY SUPERSCALAR PROCESSOR

PRIOR ART
FIG. 3
SECOND PROGRAM

C PROGRAM

```
for(y=0, i=0 ; i<N;i++)
y+=x[i] ;
```

ASSEMBLER PROGRAM

```
         mov #_x, r0
         mov #_y, r1
         mov #N, r2
         mov #0, r3
_L01:    mov @r0+ ,r4
         dt r2
         bf/s _L01
         add r4, r3
         mov r3, @r1
```

FIG. 4

EXAMPLE OF THE LOOP EXECUTION BY MULTITHREAD PROCESSOR

|    | 1ST SLOT       | 2ND SLOT       |    |
|----|----------------|----------------|----|
| 1. | mov @r0+, r4   | dt r3          |    |
| 2. | mov @r1+, r5   |                |    |
| 3. | mov @r0+, r4   | dt r2          | 1. |
| 4. | add r4, r5     |                | 2. |
| 5. | bf/s _L00      | mov r5, @(r0+r2) | 3. |
| 6. | bf/s _L01      |                | 4. |
| 1. | mov @r0+, r4   | dt r3          | 5. |
| 2. | mov @r1+, r5   | add r4, r3     | 6. |

 1ST PRIORITY THREAD (EXECUTING 1ST PROGRAM)
 2ND PRIORITY THREAD (EXECUTING 2ND PROGRAM)

CONVENTIONAL PIPELINE STRUCTURE EXAMPLE OF MULTITHREAD PROCESSOR

TYPICAL SIGNAL GENERATION TIMING

THREAD SWITCHING OF CONVENTIONAL MULTITHREAD PROCESSOR

EXAMPLE OF 1ST PRIORITY THREAD EXECUTION

|    | 1ST SLOT | 2ND SLOT |
|----|----------|----------|
| 1. | mov @r0+, r4 | dt r3 |
| 2. | mov @r1+, r5 | ~~add r4, r5~~ |
| 3. | ~~add r4, r5~~ | ~~bf/s _L00~~ |
| 4. | add r4, r5 | ~~bf/s _L00~~ |
| 5. | bf/s _L00 | mov r5, @(r0+r2) |
| 6. | ~~NT #1~~ | ~~NT #2~~ |

. . . . . . . . . . . . . . .

CONVENTIONAL PIPELINE STRUCTURE EXAMPLE
FOR DELAYED THREAD MULTIPLEX

EXAMPLE PROCESSOR OF THE INNOVATION

ISSUE INFORMATION EXAMPLE (TWO BITS PER INSTRUCTION)

ISSUE INFORMATION ENCODING
- 00: ALL ISSUE SLOTS ARE OCCUPIED AT NEXT CYCLE
- 01: 2ND ISSUE SLOT IS EMPTY AT NEXT CYCLE
- 10: ALL ISSUE SLOTS ARE EMPTY AT NEXT CYCLE
- 11: ALL ISSUE SLOTS ARE EMPTY AT NEXT CYCLE AND 2ND ISSUE SLOT IS EMPTY AT NEXT-NEXT CYCLE

PIPELINE STRUCTURE EXAMPLE OF MULTITHREAD
PROCESSOR WITH ISSUE INFORMATION

EXAMPLE OF THREAD MULTIPLEXER

EXAMPLE OF THREAD MULTIPLEX CONTROL LOGIC

| # | opv0 | thid0 | isid | thif0 | thif1 | isnxt |
|---|------|-------|------|-------|-------|-------|
| 1 | 0 |   | * | 0 | 0 | * |
| 2 | 1 |   | 00 | 0 | 0 | * |
| 3 | 1 |   | 01 | 0 | 1 | * |
| 4 | 1 |   | 10 | 1 | 1 | 00 |
| 5 | 1 |   | 11 | 1 | 1 | 01 |

FIG. 15

EXECUTION FLOW EXAMPLE OF MULTITHREAD PROCESSOR

| | 1ST SLOT | 2ND SLOT | | ISSUE INFORMATION |
|---|---|---|---|---|
| 1. | mov @r0+, r4 | dt r3 | | 00 |
| 2. | mov @r1+, r5 | ~~add r4, r5~~ | | 00 |
| 3. | ~~add r4, r5~~ | ~~bf/s _L00~~ | | 00 |
| 4. | add r4, r5 | ~~bf/s _L00~~ | | 00 |
| 5. | bf/s _L00 | mov r5, @(r0+r2) | | 00 |
| 6. | ~~NT #1~~ | ~~NT #2~~ | | 00 |
| 1. | mov @r0+, r4 | dt r3 | | 01 |
| 2. | mov @r1+, r5 | ~~mov @r0+, r4~~ | | 11 |
| 3. | mov @r0+, r4 | dt r2 | 1. | 01 |
| 4. | add r4, r5 | ~~bf/s _L01~~ | 2. | 00 |
| 5. | bf/s _L00 | mov r5, @(r0+r2) | 3. | 10 |
| 6. | bf/s _L01 | ~~add r4, r3~~ | 4. | 00 |
| 1. | mov @r0+, r4 | dt r3 | 5. | 01 |
| 2. | mov @r1+, r5 | add r4, r3 | 6. | 11 |

ISSUE INFORMATION EXAMPLE (1 BIT PER INSTRUCTION)

ISSUE INFORMATION ENCODING

0: AN ISSUE SLOT IS OCCUPIED AT NEXT CYCLE
1: ALL ISSUE SLOTS ARE EMPTY AT NEXT CYCLE

THREAD MULTIPLEX CONTROL LOGIC USING
1 BIT ISSUE INFORMATION

| # | opv0 | thid0 | isid | thif0 | thif1 | isnxt |
|---|------|-------|------|-------|-------|-------|
| 1 | 0    |       | *    | 0     | 0     | *     |
| 2 | 1    | 0     | 0    | 0     | 0     | *     |
| 3 | 1    | 1     | 1    | 1     | 1     | 0     |

FIG. 18

EXECUTION EXAMPLE OF TIME-DIVISION MULTITHREAD PROCESSOR

| | 1ST SLOT | 2ND SLOT | | ISSUE INFORMATION |
|---|---|---|---|---|
| 1. | mov @r0+, r4 | dt r3 | | 0 |
| 2. | mov @r1+, r5 | ~~add r4, r5~~ | | 0 |
| 3. | ~~add r4, r5~~ | ~~bf/s _L00~~ | | 0 |
| 4. | add r4, r5 | ~~bf/s _L00~~ | | 0 |
| 5. | bf/s _L00 | mov r5, @(r0+r2) | | 0 |
| 6. | ~~NT #1~~ | ~~NT #2~~ | | 0 |
| 1. | mov @r0+, r4 | dt r3 | | 0 |
| 2. | mov @r1+, r5 | ~~add r4, r5~~ | | 1 |
| 3. | mov @r0, r4 | dt r2 | 1. | 0 |
| 4. | add r4, r5 | ~~bf/s _L00~~ | 2. | 0 |
| 5. | bf/s _L00 | mov r5, @(r0+r2) | 3. | 1 |
| 6. | bf/s _L01 | ~~add r4, r3~~ | 4. | 0 |
| 1. | mov @r0+, r4 | ~~mov @r1+, r5~~ | 5. | 0 |
| 2. | mov @r1+, r5 | dt r3 | 6. | 1 |
| 3. | mov r4, r3 | ~~mov r3, @r1~~ | 7. | 0 |
| 4. | add r4, r5 | ~~bf/s _L00~~ | 8. | 0 |
| 5. | bf/s _L00 | mov r5, @(r0+r2) | 9. | 1 |
| 6. | mov @r0, r4 | dt r2 | 1. | 0 |

POWER REDUCTION EXAMPLE OF ISSUE CONTROL

EXAMPLE OF THREAD MULTIPLEX CONTROL LOGIC

| # | opv0 | thid0 | isid | thif0 | thif1 | isnxt | isac0 | isac1 |
|---|------|-------|------|-------|-------|-------|-------|-------|
| 1 | 0 | * | | 0 | 0 | * | 1 | 1 |
| 2 | 1 | 00 | | 0 | 0 | * | 0 | 0 |
| 3 | 1 | 01 | | 0 | 1 | * | 0 | 1 |
| 4 | 1 | 10 | | 1 | 1 | 00 | 1 | 1 |
| 5 | 1 | 11 | | 0 | 0 | * | 1 | 1 | isid==11: ISSUE INFORMATION IS INVALID

FIG. 21

ISSUE INFORMATION EXAMPLE (THREE BITS OF EACH INSTRUCTION)

| INSTRUCTION CODE (32 BITS) | | | |
|---|---|---|---|

ISSUE INFORMATION

ISSUE INFORMATION ENCODING (EMPTY ISSUE SLOT)

000: NONE
001: 2ND SLOT 1 CYCLE LATER
010: 1 CYCLE LATER
011: 1 CYCLE LATER AND 2ND SLOT 2 CYCLES LATER
100: 1,2 CYCLES LATER
101: 1,2 CYCLES LATER AND 2ND SLOT 3 CYCLES LATER
110: 1,2,3 CYCLES LATER
111: 1,2,3 CYCLES LATER AND 2ND SLOT 4 CYCLES LATER

FIG. 22

EXAMPLE OF THREAD MULTIPLEX CONTROL LOGIC USING 3-BITS ISSUE INFORMATION

| # | opv0 | thid0 | isid | thif0 | thif1 | isnxt |
|---|---|---|---|---|---|---|
| 1 | 0 | | * | 0 | 0 | * |
| 2 | 1 | | 000 | 0 | 0 | * |
| 3 | 1 | | 001 | 0 | 1 | * |
| 4 | 1 | | 010 | 1 | 1 | 000 |
| 5 | 1 | | 011 | 1 | 1 | 001 |
| 6 | 1 | | 100 | 1 | 1 | 010 |
| 7 | 1 | | 101 | 1 | 1 | 011 |
| 8 | 1 | | 110 | 1 | 1 | 100 |
| 9 | 1 | | 111 | 1 | 1 | 101 |

FIG. 23

EXAMPLE OF HOT STANDBY OPERATION WITH MULTITHREAD PROCESSOR

| | 1ST SLOT | 2ND SLOT | ISSUE INFORMATION |
|---|---|---|---|
| 1. | mov @r0, r4 | dt r3 | — |
| 1. | mov #_a, r0 | mov #_b, r1 | 01 |
| 2. | mov #_b, r1 | mov r0, @-sp | 01 |
| 3. | mov # (_c-_a), r2 | mov r1, @-sp | 01 |
| 4. | mov #_N, r3 | mov r2, @-sp | 00 |
| 1. | mov @r0+, r4 | dt r3 | 01 |
| 2. | mov @r1+, r5 | mov r3, @-sp | 11 |
| 3. | mov r3, @-sp | mov r4, @-sp | 01 |
| 4. | add r4, r5 | mov r4, @-sp | 00 |
| 5. | bf/s _L00 | mov r5, @(r0+r2) | 10 |
| 6. | mov r5, @-sp | mov r6, @-sp | 00 |
| 1. | mov @r0+, r4 | dt r3 | 01 |
| 2. | mov @r1+, r5 | mov r6, @-sp | 11 |
| 3. | mov r6, @-sp | mov r7, @-sp | 01 |
| 4. | add r4, r5 | mov r7, @-sp | 00 |
| 5. | bf/s _L00 | mov r5, @(r0+r2) | 10 |
| 6. | mov r8, @-sp | mov r9, @-sp | 00 |

EXECUTION START OF 1ST PRIORITY THREAD
FINALIZE PROCESS START OF 2ND PRIORITY THREAD

EXAMPLE SYSTEM PROVIDING REMAINED CAPABILITY
TO THE OTHER ELECTRONIC CONTROL UNITS

MULTITHREAD PROCESSOR

CLAIM OF PRIORITY

The present application claims priority from Japanese application JP 2005-300121 filed on Oct. 14, 2005, the content of which is hereby incorporated by reference into this application.

BACKGROUND OF THE INVENTION

This invention relates to an effective technique which can be applied to a processor, for example, a processor which allows priority management and efficient execution of plural instruction flows.

FIELD OF THE INVENTION

In recent years, due to the improvement in processing efficiency of processors, it is becoming common for one processor to process plural instruction flows either simultaneously or with time division. The technology now being developed aims to increase the efficiency of a multithread processor by discovering how best to select plural instruction flows.

Patent document 1 discloses a technique comprising an instruction decoding means, a priority maintenance means and a control means which judges instructions to be issued to functional units according to a given priority for each instruction flow. In Patent document 1, when there are plural instruction issue requests with the same priority, issue of instructions is judged by a method which changes the logic processor to which priority is given for each cycle, a method which gives priority to a logic processor which was not able to issue before, or a fixed method.

Hence, the processing performance of each instruction flow can be flexibly adjusted between plural instruction flows, and instruction flows having a priority of equal order can be processed uniformly. If the instruction flows are synchronized, since the latest instruction flow controls processing performance, the uniform processing of instruction flows leads to an overall improvement of processing efficiency.

Patent document 2 describes a technique which allocates processor resources based on the priority of each thread allocated by software. The technique of patent document 2 allocates resources in a fixed proportion even to threads with reduced efficiency due to cache errors, etc., and therefore avoids the problem that efficient resource allocation cannot be realized. Specifically, in the technique of Patent document 2, if a specific phenomenon or specific situation relevant to an instruction thread defined beforehand occurs, the priority of one or more threads is adjusted, and instructions are interleaved according to the priority. Hence, inefficient resource occupancy by high priority threads with reduced efficiency can be suppressed, and efficient resource allocation can be realized.

Patent document 1: JP-A No. Hei 10(1998)-124316
Patent document 2: JP-A No. 2004-326766

SUMMARY OF THE INVENTION

However, in Patent documents 1 and 2, processing efficiency is increased by hardware adjusting the priority specified by software, so there is a significant possibility that execution time will be prolonged when a high priority thread is processed by multithreading compared to when this thread is processed alone. This type of technique is therefore particularly effective in a system which gives more priority to improving efficiency than guaranteeing execution time, i.e., information systems which emphasize throughput.

On the other hand, control systems are systems which are pre-adjusted to ensure normal execution by guaranteeing response time even for the worst execution time, and throughput often suffers to guarantee execution time. For this reason, in control systems, if throughput is emphasized and a processing request is received from outside, it may then be impossible to guarantee response time. An example of control systems are the latest automobile systems which perform automobile control and information processing, and in such a system, various electronic control units which perform engine control, and brake control, and a car information system, are connected by a network in the vehicle. However, even if the electronic control units are tuned independently and for example have a remaining capability, they do not have a function which supplies the remaining capability to other electronic control units while guaranteeing the response time of the electronic control units.

For example, in Patent document 1, if an instruction of a certain thread suddenly becomes unissuable, even if an instruction of another thread can be issued, it is not issued instead of the instruction. Hence, if it is attempted to strictly maintain the priority of threads, if an instruction of the highest priority thread suddenly becomes unissuable, it will become impossible to issue any instructions. Also, in general, a possibility judgment of issuing instructions is performed just before the instructions are issued, so if the priority of threads is strictly maintained, it will be difficult to issue instructions except for the highest priority thread.

It is therefore an object of the invention to provide a processor which can attain an increase in processing efficiency.

It is another object of this invention to provide a processor which can guarantee response time while strictly maintaining the priority specified by software.

It is still a further object of this invention to provide a processor which can supply a remaining capability to other electronic control units.

The other objects and novel features of this invention will become clear from the description and accompanying drawings of the present specification.

The salient features of the invention as disclosed in this application are as described below.

[1] The processor relating to this invention has an issue instruction multiplexer (10).

The processor can decode and execute an instruction supplied to the issue instruction multiplexer. The instruction contains issue information (isid) for the next and subsequent operating cycles after the operating cycle at which the instruction was issued. The issue information is information which shows the position of an operating cycle at which the instruction can be issued.

Due to the above, when an instruction is issued at an operating cycle, since the position of the operating cycle which can issue the instruction is already known for the next and subsequent operating cycles due to the issue information in this instruction, the required instruction can be issued according to the position of this operating cycle, and an increase in processing efficiency of the processor can be attained. In this specification, the position of the operating cycle is also referred to as a slot.

In one aspect of the invention, the issue information is information generated at the first execution of an instruction, or on the immediately preceding occasion it was executed. Due to this, the issue information can be utilized from the 2nd occasion on which the instruction is executed.

In another aspect of the invention, the issue information is information generated when the instruction is created. Due to this, the issue information can be utilized from the first occasion on which the instruction is executed.

In another aspect of the invention, an instruction cache (IC) temporarily stores the instruction.

An instruction issue information buffer (ISINF) temporarily stores the issue information. The issue information is read from the instruction issue information buffer together with the instruction read from an instruction cache. Due to this, the issue information can be added to the instruction. Further, to add new issue information to a new instruction, it is sufficient to update the instruction issue information buffer.

In another aspect of the invention, the instruction has a priority.

The issue instruction multiplexer, based on the issue information, issues a high priority instruction to the aforesaid operating cycle, and issues a low priority instruction to an operating cycle other than the aforesaid operating cycle. Due to this, since a low priority instruction is issued to another operating cycle (or next operating cycle) to which high priority instructions are not issued, response time can be guaranteed while strictly maintaining the priority specified by software.

In another aspect of the invention, the issue instruction multiplexer has an issue possibility judgment circuit (ISO) which judges whether or not to issue the instruction. When a high priority instruction can be issued, the issue possibility judgment circuit is inactivated. Due to this, when instruction issue possibility can be judged by the issue information, the issue possibility judgment circuit is not used, so power consumption can be reduced.

[2] The processor according to this invention performs N (N is a plural integer) threads simultaneously or by time division, without being accompanied by save and restore of the processor state. The threads have a priority. The processor, when N−1 or less threads are executed and a thread whose priority is higher than that of the thread being executed is received, starts termination processing of lower priority threads than the aforesaid thread, or executes the aforesaid thread as a low priority thread.

Due to the above, when there is a possibility that a high priority thread which must be executed immediately will be received, the processor can be placed in a hot standby state without executing at least one of the plural threads. For this reason, a thread not being executed can be executed immediately, and if this thread is given the highest priority, the priority of the threads being executed will become lower, so the response time of the highest priority thread can be guaranteed. Also, if there is a possibility that other first priority threads will be received, termination processing of lower priority threads than the thread being executed is started, and the processor can be returned to the hot standby state.

Therefore, by maintaining the hot standby state, immediate execution of 1st priority threads can be guaranteed, so the remaining capability can be utilized and processing requests from outside can also be received while guaranteeing the original response time. For example, in a control system having plural electronic control units to which this processor is applied, the remaining capability can be supplied to other electronic control units, so efficient load distribution can be performed.

[3] The processor according to this invention executes plural threads simultaneously or by time division without being accompanied by evacuation recovery of the processor state. The plural threads have a priority. The processor, when an instruction flow in a 1st priority thread is executed for the first time, stores the position of an operating cycle at which instructions in the instruction flow can be issued, and executes a 2nd priority thread in a different operating cycle from the aforesaid operating cycle on the 2nd and subsequent executions of the instruction flow.

Due to the above, during the 2nd and subsequent executions of the instruction flow, the 2nd priority thread is executed by another operating cycle in which the 1st priority thread is not executed according to the position of the operating cycle, so the processing efficiency of the processor can be increased, and response time can be guaranteed while strictly maintaining the priority specified by the software.

[4] The processor according to the invention selects instructions to be issued by the issue instruction multiplexer, and processes instruction execution by plural threads. The issue instruction multiplexer controls the position of later operating cycles at which instructions can be issued according to issue information in the issued instructions.

Due to the above, since the operating cycle position at which an instruction can be issued, can be judged for the next and subsequent operating cycles using the issue information in the issued instructions, a required instruction can be issued according to this judged operating cycle position. Therefore, the processing efficiency of the processor can be increased.

Some typical advantages of the invention are, described briefly, as follows.

An increase in processing efficiency can be attained. Response time can be guaranteed while strictly maintaining the priority specified by software. Further, the remaining capability can be supplied to other electronic control units.

BRIEF DESCRIPTION OF THE DRAWINGS

FIG. 1 is a diagram describing a first program;

FIG. 2 is a diagram describing execution of the loop part of an assembler program respectively corresponding to a scalar processor and a two-way superscalar processor;

FIG. 3 is a diagram describing a second program;

FIG. 4 is a diagram describing execution of a loop part by a multithread processor;

FIG. 15 is a diagram describing operation of the processor 1 which issues an instruction of a 2nd priority thread by an empty issue slot of a 1st priority thread;

FIG. 18 is a diagram describing operation of the processor according to a second embodiment which issues an instruction of a 2nd priority thread by an empty issue slot of a 1st priority thread;

FIG. 21 is a diagram showing an example wherein 3 bits of issue information are added to an instruction code;

FIG. 22 is a diagram describing a thread selection control logic using the 3 bits of issue information;

FIG. 23 is a diagram describing hot standby execution by a processor according to a fifth embodiment.

DETAILED DESCRIPTION OF THE PREFERRED EMBODIMENTS

Multithread processor

Figure 5:
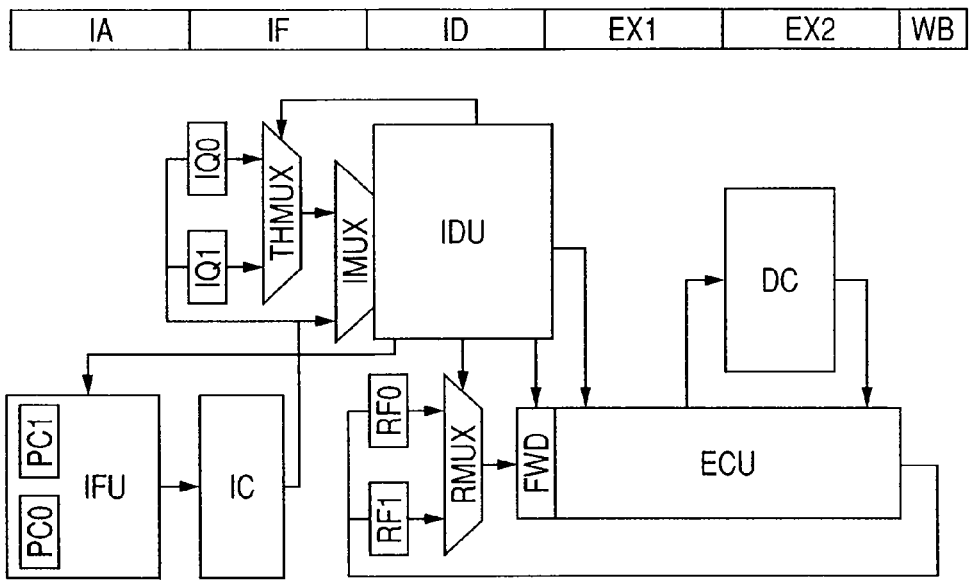
FIG. 5 is a diagram describing the pipeline structure of a processor of a comparative example.

Before describing each embodiment according to this invention in detail, the construction and operation of the multithread processor used as the comparative example for each embodiment, will first be described based on FIGS. 1-9. In FIG. 1, a first program for describing an operating example of the processor is illustrated. The first program is a program which adds two arrays a[i], b[i] of N elements, and stores them in an array c[i] as described in C language. A case where this first program is compiled by an assembler will be described.

In this assembler program, an architecture having a post increment loading instruction and a predecrement store instruction, for which push/pop of a stack is a major application, e.g., a scalar processor, is envisaged. For this purpose, the post increment loading instruction is used for loading the array.

Since there is no post increment store instruction, an ordinary store instruction without address update is used for store in the array by making use of the fact that the distance between array elements c [i], a [i] is constant during execution of the program.

First, as an initial setting, the leading addresses _a, _b, distance_c-_a between the addresses of two arrays, and number N of array elements, are stored in registers r0, r1, r2, r3, respectively by four immediate transfer instructions "mov #_a, r0", "mov#_b, r1", "mov #(_c-_a), r2", "mov#N, r3". Next, in a loop, array elements are loaded in r4, r5 from the addresses of the arrays a, b specified by r0, r1, and at the same time r0, r1 are incremented to specify the following array elements by the post increment loading instructions "mov @r0+, r4", "mov @r1+, r5". Next, even if it is attempted to add data immediately, the processor waits for the load data, so the number N of elements stored in r3 is decremented by the decrement test instruction "dt r3" before addition, and a test is performed as to whether or not the result is zero. If it is zero, a flag is set, and if it is not zero, the flag is cleared.

Next, the array elements loaded in r4, r5 are added by an addition instruction "add r4, r5", and stored in r5. A flag is checked by a conditional branch instruction with delay slot "bf/s_L00". If it is clear, the remaining elements N are still not zero, so after delay slot instruction execution, the program branches to the head of the loop specified by the label_L00. On the other hand, if it is set, the remaining elements N are zero, so the program escapes from the loop without branching. Finally, r0 which specifies the elements of the array a, and r2 which stored the "distance_c-_a between the addresses of the arrays a, c", are added by the delay slot instruction "mov r5, @(r0+r2)", and the value of r5 which is the addition result of the array elements, is stored at its address.

Next, the case where this assembler program is optimized for a 2-way superscalar processor in which two instructions can be executed simultaneously, will be described. Here, it is assumed that the superscalar method allows simultaneous issue of a load store instruction and another instruction. For this reason, in the assembler program optimized for a superscalar, in order to avoid resource conflict by consecutive instructions of the same kind, the order of the post increment loading instruction "mov @r1+, r5" and decrement test instruction "dt r3" is reversed.

In FIG. 2, the operation of loops of assembler programs respectively corresponding to a scalar processor and two-way superscalar processor is illustrated. Here, the load latency is assumed to be 2, and if the distance between the loading instruction and the instruction which uses load data is 2 or more, the program is not stalled. The operating cycle of a branch instruction, i.e., the distance between the branch instruction and a target instruction, is set to 2. As a result, in the operating example of the scalar processor, 6 instructions which constitute the loop of the corresponding assembler program can be executed in 6 cycles.

On the other hand, in the operating example of the 2-way superscalar processor, the same 6 cycles as those of the scalar processor are passed during execution of 6 instructions which constitute the loop of the corresponding assembler program.

The reason is as follows. The fourth instruction "add r4, r5" must wait for the execution result of the third instruction "mov @r1+, r5", and empty slots for three instructions are thereby created. Since the successive instruction "bf/s_L00" of "add r4, r5" cannot be executed simultaneously with "add r4, r5" due to an execution resource conflict, an empty slot for one instruction is created. Also, since the distance between "bf/s_L00" and the leading loop instruction "mov @r0+, r4" which is its target instruction is 2, an empty slot for two instructions is created.

Therefore, in the operating example of the 2-way superscalar processor, since a total of 6 issue slots are empty slots, as shown in the diagram, the same 6 cycles as those of the scalar processor are passed during execution of 6 instructions. For this reason, the IPC (Instructions per cycle) of the 2-way superscalar processor is usually a maximum of 2, but in the corresponding assembler program, IPC is 1 and the processor efficiency falls. IPC is a performance index of the processor, and is a unit which shows how many instructions can be executed in 1 cycle.

In such a case, the multithreading method utilizes empty issue slots to increase processor efficiency. This multithreading method is a method which executes plural instruction flows simultaneously or by time division using plural program counters and register files.

Hereafter, the case will be considered where, in the multithreading method, empty issue slots during execution of the first program are utilized to execute a second program shown in FIG. 3. The second program is a program which adds N elements of an array x and assigns the result in a variable y as described in C language. The case where this second program is compiled by an assembler, will be described. First, as an initial setting, the leading address _x, the address _y of the variable y, the number N of elements in the array and the initial value 0 of the variable y, are stored in registers r0, r1, r2, r3, respectively by the four immediate transfer instructions "mov #_x, r0", "mov #_y, r1", "mov #N, r2", "mov #0, r3".

In the loop, the array elements are loaded to r4 from the address of the array a specified by r0 by the post increment loading instruction "mov @r0+, r4", and r0 is incremented to specify the following array elements. Next, even if it is attempted to add data immediately, the processor waits for load data, so the number N of elements stored in r2 is decremented by the decrement test instruction "dt r2" before addition, and a test is performed as to whether or not the result is zero. If it is zero, a flag is set, and if it is not zero, the flag is cleared. Next, a flag is checked by a conditional branch instruction with a delay slot "bf/s_L01". If it is clear, the remaining elements N are still not zero, so after execution of the delay slot instruction, the program branches to the head of the loop specified by the label_L01. On the other hand, if it is set, the remaining elements N are zero, so the program escapes from the loop without branching. The loaded array elements r4 are added to r3 which stored the variable y by the delay slot instruction "add r4, r3", and r3 is updated. When the remaining number N of elements becomes zero and the program escapes from the loop, the value of the addition result r3 is stored at the address of the variable y by the store instruction "mov r3, @r1".

FIG. 4 shows, in a multithread processor, the operation of the loop when empty issue slots during execution of the first program are utilized to execute the second program. Here, the first and second programs are executed by allocating them to the first and second threads of the multithread processor. Regarding the priority of the two programs, that of the first program is always higher.

For this purpose, the loop of the first program repeats the same operations as those of FIG. 2 in 6 cycle units. On the other hand, since its priority is low, the second program can be executed only when the first program does not use an issue slot and there is an empty execution resource available. As a result, as shown in FIG. 4, in the empty slot of the 2nd cycle of the loop of the first program, the first program is simultaneously executing "mov @r1+, r5", so there is no vacancy in the execution resources of the load store instructions and the leading instruction "mov @r0+, r4" of the loop of the second program cannot be executed. In the two empty slots of the 3rd cycle, "mov @r0+, r4" and "dt r2" can be executed. In the empty slot of the 4th cycle, since the first program is executing "add r4, r5", there is no vacancy in execution resources apart from load store instructions, and "bf/s_L01" of the second program cannot be executed. In the two empty slots of the 6th cycle, "bf/s_L01" can be executed. However, since "add r4, r3" of the next instruction competes with "bf/s_L01" for resources, it cannot be executed. In an empty slot of the 2nd cycle of the next loop of the first program, "add r4, r3" can be executed.

Therefore, the second program utilizes 4 of 6 empty slots with a 2 cycle shift from the first program, and can execute processing of the loop in 6 cycles. In other words, in this multithread processor, since 10 instructions are executed in 6 cycles, the IPC which was 1 in the example of FIG. 2 becomes about 1.7, and efficiency is significantly improved.

FIG. 4 shows an operating example which assumes that the second program can be utilized if there are issue slots and resources not used by the first program. However in practice, if it is attempted to strictly maintain the priority of threads and an instruction of the highest priority thread suddenly becomes unissuable, no further instructions can be issued. Moreover, the feasibility of issuing an instruction is generally judged just before it is issued, so if the priority of threads is strictly maintained, it is difficult to issue instructions other than for the highest priority threads.

FIG. 5 shows a pipeline structure of a multithread processor which is a comparative example. Here, two programs can be executed in parallel by two register files RF0, RF1 and two program counters PC0, PC1. Cycle-by-cycle program switching is allowed by two instruction queues IQ0, IQ1. The pipeline has 6 stages, i.e., an instruction address IA, instruction fetch IF, instruction decode ID, executions EX1, EX2 and write back WB.

In the instruction address stage IA, the instruction fetch unit IFU generates an instruction fetch address IFA from a branch address BA supplied from an instruction decoder IDU and the two program counters PC0, PC1, and supplies it to the instruction cache IC.

In the instruction fetch stage IF, the instruction fetched from the address specified by the instruction fetch address IFA of the instruction cache IC, is supplied to an instruction multiplexer IMUX and the instruction queue IQ0 or IQ1 as an instruction cache output. If the supplied instruction is to be used immediately, the instruction cache output is selected by the instruction multiplexer IMUX, and supplied to the instruction decoder IDU. On the other hand, if it is not to be used immediately, an instruction OPIC is buffered in the instruction queue IQ0 or IQ1. The instruction buffered in the instruction queue IQ0 or IQ1, is outputted from the head of the queue, selected by a thread multiplexer THMUX and the instruction multiplexer IMUX, and supplied to the instruction decoder IDU.

In the instruction decode stage ID, the supplied instruction is decoded and the control signal of a register thread multiplexer RMUX, forwarding circuit FWD and execution unit EXU is outputted. It is also judged whether or not a resource and an operand required for instruction execution are available. If execution is impossible, the IDU delays issue of an instruction until execution becomes possible, and stalls successive instructions. If execution is possible, an execution start is ordered. Also, in the register thread multiplexer RMUX and forwarding circuit FWD, the execution unit EXU is supplied by selecting an operand according to control information.

In the execution stages EX1, EX2, the execution unit EXU executes the instruction according to the control information from the instruction decoder IDU. In particular, in the EX2 stage, a data cache DC access is performed. In the write back stage WB, the execution result of the instruction is stored in the register file RF0 or RF1.

Figure 6:
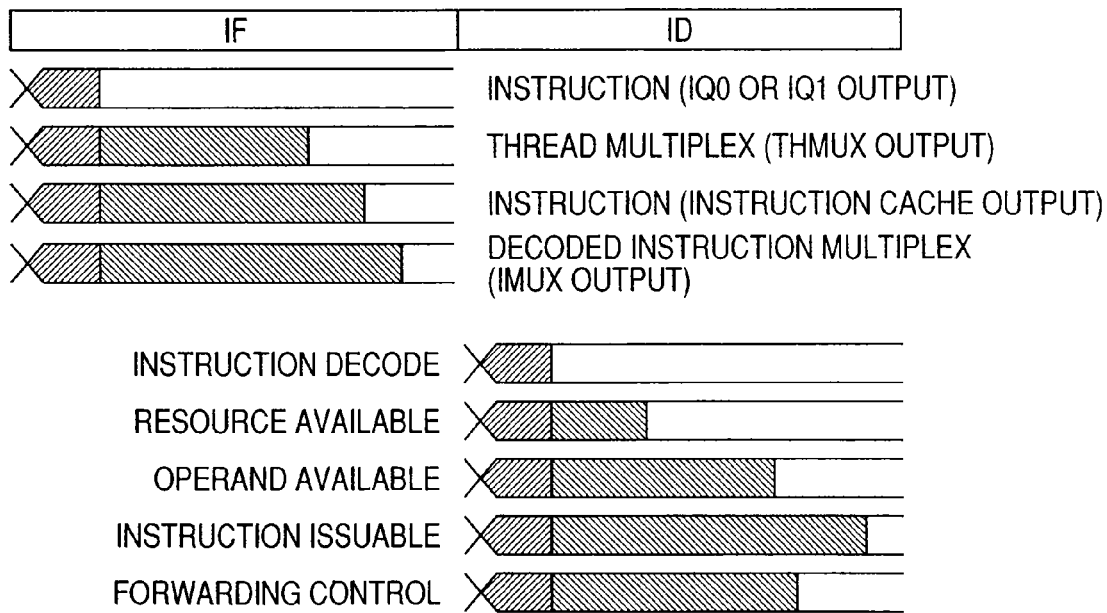
FIG. 6 is a diagram describing a typical signal generation timing.

FIG. 6 shows a typical signal generation timing. In the instruction fetch stage IF, the instruction queue IQ0 or IQ1 output, the thread multiplexer THMUX output, the instruction cache output and the instruction multiplexer IMUX output are judged in that order. In the instruction decode stage ID, an instruction code, resource availability, operand availability, forwarding control information and instruction issue possibility are successively judged.

Figures 7, 8:
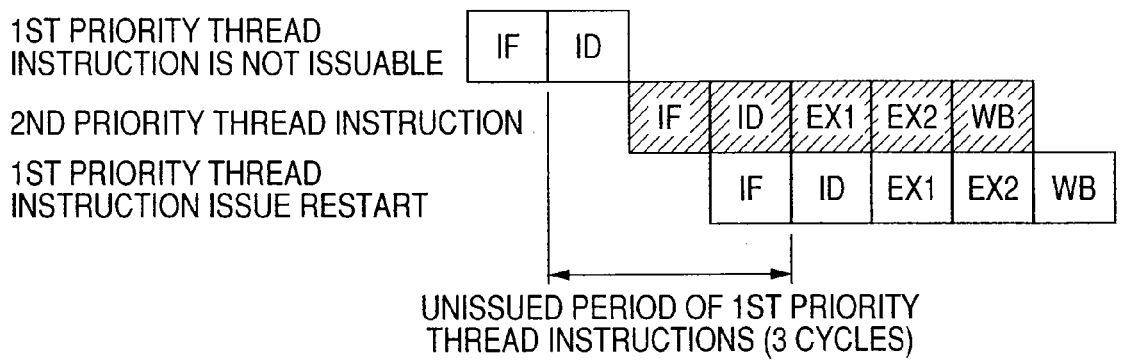
FIG. 7 is a diagram describing thread switching by a multithread processor of a comparative example.
FIG. 8 is a diagram describing an instruction processed an instruction decode stage ID.

FIG. 7 shows thread switching when thread priority is strictly maintained. First, since instruction issue possibility is judged at the end of the instruction decode stage ID, the 1st priority thread is executed up to the instruction decode stage ID. If it is judged that the instruction is not issuable in the instruction decode stage ID, an instruction of the 2nd priority thread will be selected by thread multiplexer THMUX of the instruction fetch stage IF, and the instruction of the 2nd priority thread will be executed. Subsequently, when the instruction of the 1st priority thread can be executed, it is re-started. As a result, as shown in the diagram, although there are three cycles when the 1st priority thread has not issued an instruction, an instruction of the 2nd priority thread can be issued only in 1 cycle. Moreover, if there are two or less cycles when the instruction of the 1st priority thread is not issuable, an instruction of the 2nd priority thread cannot be issued.

FIG. 8 shows the case, in the operating example of FIG. 2, of instructions processed by the instruction decode stage ID including instructions which were not issued by the instruction decode stage ID. In the diagram, instructions with a cancellation line are instructions which were not issued. The conditional branch instruction with a delay slot "bf/s_L00" performs condition judgment during execution. For this purpose, when "bf/s_L00" is decoded by the instruction decode stage ID, in the instruction fetch stage IF, an instruction executed without branching, i.e., in this example an instruction executed when the program escapes from the loop, is selected and supplied to the decode stage ID. In FIG. 8, instructions executed without branching are NT#1 and NT#2. While the loop is being repeatedly executed, these instructions are canceled by the instruction decode stage ID and are not issued.

In FIG. 8, the period during which no instructions can be issued is 2 cycles or less. For example, the addition instruction "add r4, r5" and the branch instruction "bf/s_L00" are kept waiting without being issued for 2 cycles, and other instructions can be issued immediately. For this reason, in the pipeline structure of the multithread processor shown in FIG. 5, as described in FIG. 7, there is the problem that an instruction of the 2nd priority thread cannot be issued.

One method of solving this problem is to delay thread selection. In other words, the thread to be executed can be selected after determining instruction issue possibility by the instruction decode stage ID.

Figure 9:
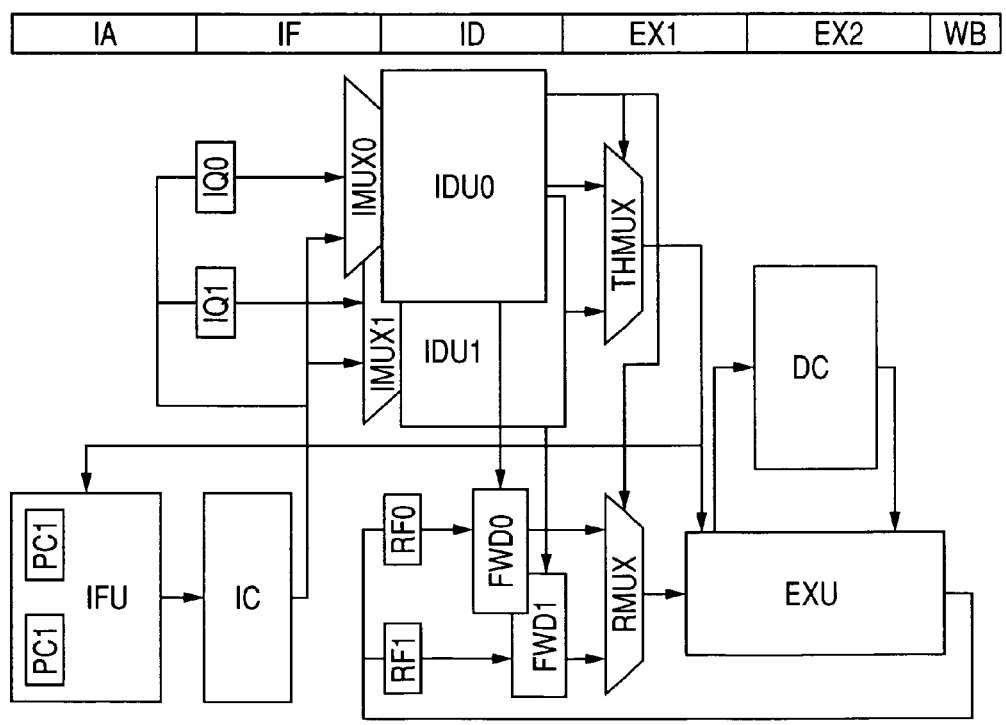
FIG. 9 is a diagram describing the pipeline structure of a comparative example when thread selection is delayed.

In FIG. 9, a pipeline structure which is a comparative example when thread selection is delayed, is described. First, the instruction address stage IA is identical to the method of FIG. 5. In the instruction fetch stage IF, thread selection shown in FIG. 5 is not performed, and in the multiple instruction multiplexers IMUX0, IMUX1, an instruction supplied to the multiple instruction decoders IDU0, IDU1 is selected. In the instruction multiplexer IMUX0, the instruction cache output or instruction queue IQ0 output is selected. In the instruction multiplexer IMUX1, the instruction cache output or instruction queue IQ1 output is selected. At this time, an instruction of the 1st priority thread is supplied to the instruction decoder IDU0.

In the instruction decode stage ID, an instruction supplied to the multiple instruction decoders IDU0, IDU1 is decoded, and a control signal of the multiple forwarding circuits FWD0, FWD1 and a control signal of the execution unit EXU are outputted. It is judged whether or not a resource and an operand required for instruction execution are available. If execution is impossible, the IDU delays issue of an instruction until execution becomes possible, and stalls successive instructions. On the other hand, if execution is possible, an execution start is ordered. The instruction decoder IDU0 then outputs an execution possibility judgment result to the register thread multiplexer RMUX and the control signal thread multiplexer THMUX of the execution unit EXU. The forwarding circuits FWD0, FWD1 select an operand according to control information, and supply it to the register thread multiplexer RMUX.

In the execution stages EX1, EX2, the control signal thread multiplexer THMUX of the execution unit EXU selects the control information from the instruction decoders IDU0, IDU1 according to the execution possibility judgment result from the instruction decoder IDU0. The register thread multiplexer RMUX selects an operand from the forwarding circuits FWD0, FWD1 according to the execution possibility judgment result. When the execution possibility judgment result is "possible", execution of the 1st priority thread decoded by the instruction decoder IDU0 is possible, so the control information from the instruction decoder IDU0 and the output of the forwarding circuit FWD0 are selected. On the other hand, when the execution possibility judgment result is "impossible", an instruction of the 2nd priority thread is issued, so the control information from the instruction decoder IDU1 and the output of the forwarding circuit FWD1 are selected. The subsequent execution is identical to that of the example of FIG. 5.

Therefore, according to the pipeline structure shown in FIG. 9, execution threads can be switched at each cycle, but on the other hand, the hardware to be multiplexed increases by the amount that that thread selection is delayed from the instruction fetch stage IF. In other words, the hardware in the instruction decode stage ID becomes relatively large, the surface area increases due to multiplexing in this stage, and the surface area efficiency falls. Since processing of the instruction decode stage ID is performed also for threads which are not executed, the power consumption of the instruction decode stage ID doubles.

The inherent object of a multithread processor is to increase efficiency with the addition of relatively little hardware to a single thread processor which cannot use up peak IPC. It is therefore undesirable for efficiency to fall due to the aforesaid multiplexing. Further, in the example of FIG. 9, thread selection is performed by the execution stage EX1, so the cycle time of the execution stage EX1 increases and operating frequency falls. In the example of FIG. 5, thread selection is performed only when the instruction cache output is buffered by the instruction queue IQ0 or IQ1, so the cycle time does not increase.

Hence, in the comparative example shown in FIG. 5, issue of 2nd priority threads was difficult, and in the comparative example shown in FIG. 9, there was a problem that area efficiency, power efficiency and operating frequency fell. On the other hand, in the embodiments shown below, these problems are resolved by adding issue information to the instruction code for the instructions executed at the following and subsequent cycles.

Embodiment 1

Figure 10:
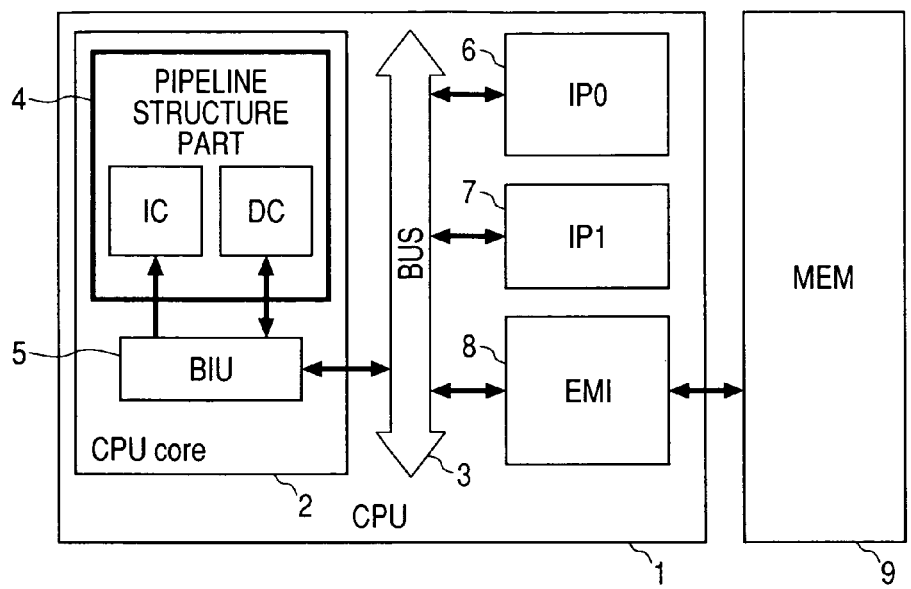
FIG. 10 is a schematic diagram showing the construction of a processor according to a first embodiment of the invention.

FIG. 10 schematically shows the construction of a processor according to Embodiment 1 of the invention. A CPU (central processing unit, hereafter referred to also as a processor) 1 is a multithread processor comprising a CPU core 2 and a BUS (Internal Bus) 3 which is an internal bus.

The CPU core 2 has a pipeline structure part 4 and a BIU (Bus Interface Unit) 5. The processor 1 has functional modules (hereafter, referred to as IP) 6, 7 referred to as IP (Intellectual Property) modules, and an EMI (External Memory Interface) 8 which is an external bus interface part. A MEM (Memory) 9 or the like is connected to the processor 1.

The pipeline structure part 4 is a part which is pipelined for improvement in speed, the pipeline being tuned according to the speed of an on-chip high speed memory such as a cache. For this reason, the BIU 5 which is not pipelined is used for access outside the CPU core 2.

Figure 11:
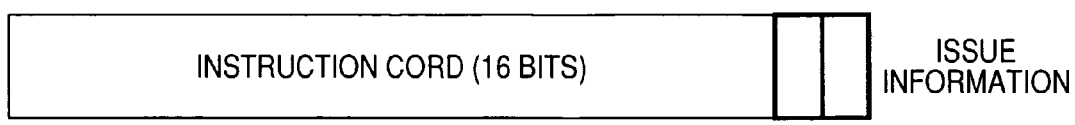
FIG. 11 is a diagram showing an example wherein 2-bit issue information is added to one instruction.

FIG. 11 shows an example wherein 2-bit issue information is added to one instruction. Although the instruction length of the instruction code shown in this diagram is not particularly limited, in this embodiment, it is 16 bits. Also, the issue information encoding is as follows: 00: "all issue slots are occupied at next cycle", 01: "2nd issue slot is empty at next cycle", 10: "all issue slots are empty at next cycle", 11: "all issue slots are empty at next cycle and 2nd issue slot is empty at next cycle".

Figure 12:
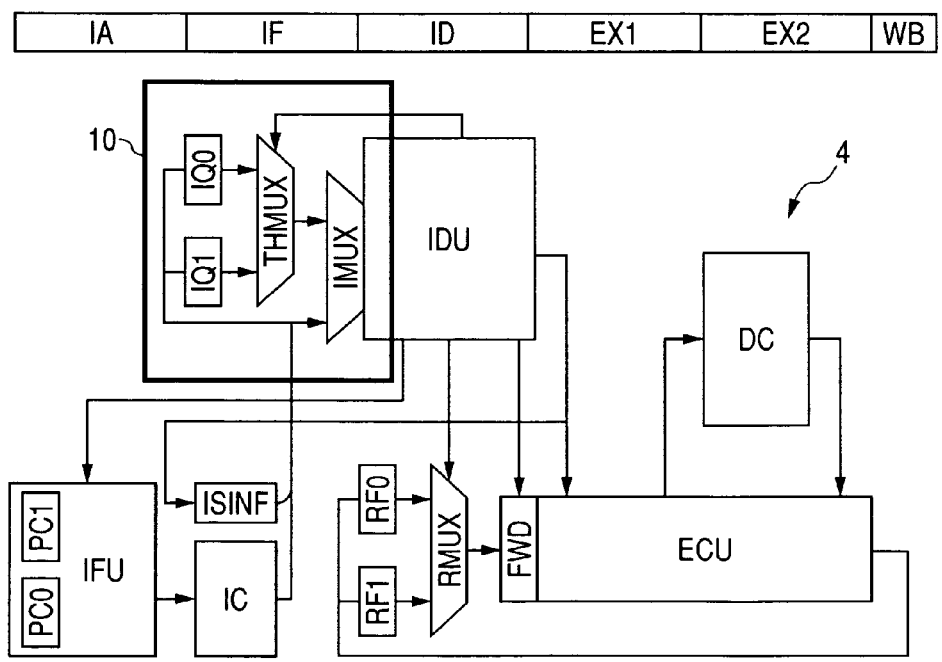
FIG. 12 is a diagram describing a pipeline structure part 4 of a processor 1 which utilizes issue information.

FIG. 12 shows the pipeline structure part 4 of the processor 1 which uses the issue information. In the diagram, for convenience, a region comprising the instruction queues IQ0, IQ1, thread multiplexer THMUX, instruction multiplexer IMUX and a latch part of the instruction decoder IDU are surrounded by a thick line, and considered as a thread multiplexer 10. Compared with the pipeline structure shown in FIG. 5, this pipeline structure part 4 differs in that the issue information buffer ISINF is added. The 2-bit issue information is additional information generated by the instruction decode stage ID and added to an instruction buffered in the instruction cache IC. The issue information buffer ISINF is an array independent of the instruction cache IC, and stores 2-bit issue information. Hence, when adding issue information to an instruction, only the issue information buffer ISINF need be updated. Although the instruction cache IC and the array are independent, the issue information buffer ISINF can read issue information at the same time as an instruction during read-out by providing a write entry. When an instruction cache IC entry is replaced, the corresponding issue information is initialized. When the issue information is unknown, it is possible that an instruction can be issued, so 00: "all issue slots are occupied at next cycle" is taken as an initial value.

Figures 13, 14:
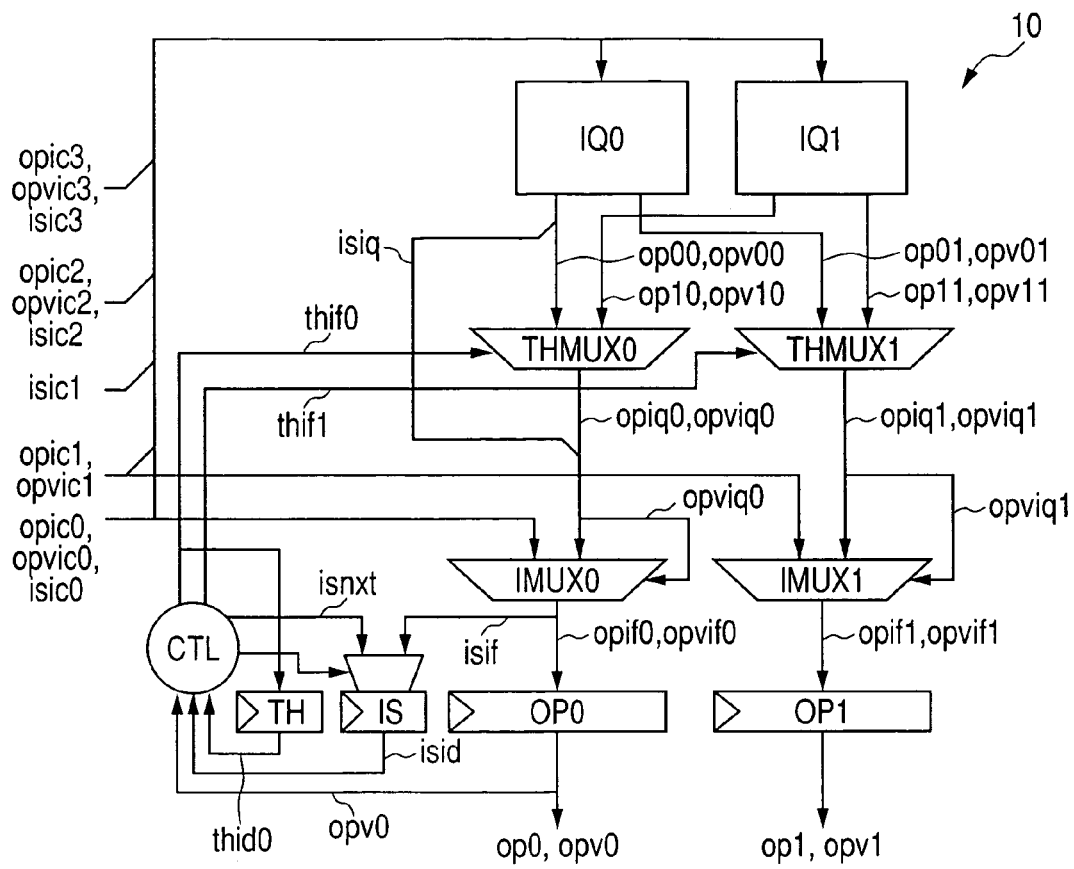
FIG. 13 is a diagram describing a thread multiplexer 10.
FIG. 14 is a diagram describing a thread selection control logic using 2-bit issue information.

FIG. 13 shows a thread multiplexer 10. The thread multiplexer 10 outputs two instructions op0, op1 for simultaneous issue of 2 instructions by the superscalar method together with their valid information opv0, opv1. Four instructions opic0, opic1, opic2, opic3 of the instruction cache IC output which are multiplexer input signals, their valid signals opvic0, opvic1, opvic2, opvic3, and the issue information isic0, isic1, isic2, isic3 from the issue information buffer ISINF added to the instructions, are inputted to the multiplexer 10.

The four instructions opic0, opic1, opic2, opic3, and their valid signals opvic0, opvic1, opvic2, opvic3 are inputted to the instruction queues IQ0, IQ1. The issue information isic0, isic1, isic2, isic3 is inputted into the instruction queue IQ0. The first instruction opic0, valid signal opvic0 and first instruction additional information isic0 are also inputted to the instruction multiplexer IMUX0. The second instruction opic1 and its valid signal opvic1 are inputted also to the instruction multiplexer IMUX1, and when an instruction of the instruction cache IC output is supplied immediately, the instruction multiplexer IMUX0 or instruction multiplexer IMUX1 is selected.

The instruction queue IQ0 outputs the two leading instructions of the buffered instructions as a 1st instruction op00 and 2nd instruction op01 of the 1st priority thread, and it also outputs valid signals opv00, opv01 which show whether these instructions are valid. Further, the instruction queue IQ0 outputs issue information isiq for the 1st instruction op00. The instruction queue IQ1 outputs the two leading instructions of the buffered instructions as a first instruction op10 and second instruction op11 of the 2nd priority thread, and it also simultaneously outputs valid signals opv10, opv11 which show whether these instructions are valid.

The thread multiplexer THMUX0, if a 1st instruction thread selection signal thif0 outputted from a thread selection control circuit CTL is 0, selects the 1st instruction op00 and its valid signal opv00 of the 1st priority thread, and if the 1st instruction thread selection signal thif0 is 1, selects the 1st instruction op10 and its valid signal opv10 of the 2nd priority thread. The thread multiplexer THMUX0 then outputs these as a 1st instruction opiq0 and valid signal opviq0. Since the issue information isiq is used only when the 1st instruction thread selection signal thif0 is 0, it is added to the 1st instruction opiq0 regardless of the value of the 1st instruction thread selection signal thif0. The thread multiplexer THMUX1, if a 2nd instruction thread selection signal thif1 outputted from the thread selection control circuit CTL is 0, selects the 2nd instruction op01 and its valid signal opv01 of the 1st priority thread, and if the 2nd instruction thread selection signal thif1 is 1, selects the 2nd instruction op11 and its valid signal opv11 of the 2nd priority thread. The thread multiplexer THMUX1 then outputs these as a 2nd instruction opiq1 and valid signal opviq1.

The instruction multiplexer IMUX0, when the valid signal opviq0 of the thread multiplexer THMUX0 output is 1, selects the thread multiplexer THMUX0 output opiq0, valid signal opviq0 and issue information isiq. The instruction multiplexer IMUX0, when the valid signal opviq0 is 0, selects the instruction cache IC output instruction opic0, valid signal opvic0 and issue information isic0. The instruction multiplexer IMUX0 then outputs these as a 1st instruction opif0, valid signal opvif0 and issue information isif. The instruction multiplexer IMUX1, when the valid signal opviq1 of the thread multiplexer THMUX1 output is 1, selects the thread multiplexer THMUX1 output opiq1 and its valid signal opviq1. The instruction multiplexer IMUX1, when the valid signal opviq1 is 0, selects the instruction cache IC output instruction opic1 and its valid signal opvic1. The instruction multiplexer IMUX1 then outputs these as a 2nd instruction opif1 and valid signal opvif1. The instruction multiplexers IMUX0, IMUX1 are required circuits when selecting the instructions supplied from the instruction cache IC read to the instruction decoder IDU by the instruction fetch stage IF in 1 cycle, as in this embodiment. For this reason, when the number of pipeline stages is increased and instruction codes are always first stored in the instruction queues IQ0, IQ1, the instruction multiplexers IMUX0, IMUX1 are not required.

An instruction decoder input latch OP0, when it is judged by the instruction decode stage ID that output is executable and an instruction was issued, latches the 1st instruction opif0 and its valid signal opvif0 of the instruction multiplexer IMUX0 output as the next instruction decoder input, and outputs these as a new 1st instruction op0 and valid information opv0. An instruction decoder input latch OP1, when it is judged by the instruction decode stage ID that output is executable and an instruction was issued, latches the 2nd instruction opif1 and its valid signal opvif1 of the instruction multiplexer IMUX1 output as the next instruction decoder input, and outputs these as a new 2nd instruction op1 and valid information opv1.

A 1st instruction thread latch TH latches the 1st instruction thread selection signal thif0 outputted from the thread selection control circuit CTL while simultaneously updating the instruction decoder input latch OP0, and outputs a 1st instruction thread thid0 of the instruction decode stage ID. If the 1st instruction thread thif0 is 0, an issue information latch IS selects the information isif as input. If the 1st instruction thread thif0 is 1, the issue information latch IS selects an input issue information isnxt outputted from the thread selection control circuit CTL. The issue information latch IS latches while simultaneously updating the instruction decoder input latch OP0, and outputs the result as next cycle issue information isid of the instruction decode stage ID.

FIG. 14 shows the thread selection control logic using 2-bit issue information.

The thread selection control circuit CTL takes the 1st instruction valid information opv0, 1st instruction thread thid0 and issue information isid of the instruction decode stage ID as input, and generates and outputs the thread selection signals thif0, thif1 and issue information isnxt according to the truth value table of FIG. 14.

Case #1 of FIG. 14, is a case where the 1st instruction valid information opv0 is 0 and the thread selection signal thif0 is 0. This corresponds to the case when there is no valid instruction although an instruction of thread 0 which is a 1st priority thread was selected, and the issue information isid also does not hold any valid information. For this reason, in the following cycle also, both the 1st and 2nd instruction thread selection signals thif0, thif1 are 0 so that the instruction of thread 0 which is a 1st priority thread is selected. Since the 1st instruction thread selection signal thif0 is 0, the issue information isnxt is not selected as an input of the 1st instruction thread latch TH and it is a signal which is not used even if it is generated, so the output can be any value. In FIG. 14, an asterisk (*) represents any value.

The cases #2 to #5, are cases where opv0 is 1 and the instruction is valid, or thid0 is 1 and the 2nd priority thread is selected. This condition can be classified exclusively as the case where opv0 is 1, thid0 is 0 and the 1st priority thread is selected, and the case where thid0 is 1 and the 2nd priority thread is selected.

In the former case, the issue information isif added to the 1st instruction opif0 of the 1st priority thread is selected as the issue information isid. In this case, from the encoding of FIG. 11, it is known whether or not the 1st priority thread will subsequently occupy an issue slot, so the 1st and 2nd instruction thread selection signals thif0, thif1 are judged as in FIG. 14. Specifically, in case #2, the issue information isid is 00: "all issue slots are occupied at next cycle", and in the next cycle, both the 1st and 2nd instruction thread selection signals thif0, thif1 are 0 so an instruction of thread 0 which is a 1st priority thread is selected. In case #3, the issue information isid is 01: "2nd issue slot is empty at next cycle", and in the next cycle, the 1st and 2nd instruction thread selection signals thif0, thif1 are 0 and 1, respectively, so thread 0 which is a 1st priority thread is selected as a 1st instruction, and thread 1 which is a 2nd priority thread is selected as a 2nd instruction. In cases #4 and #5, the issue information isid is respectively 10: "all issue slots are empty at next cycle" and 11: "all issue slots are empty at next cycle and 2nd issue slot is empty at next next cycle", and in the next cycle, both the 1st and 2nd instruction thread selection signals thif0, thif1 are 1, so an instruction of thread 1 which is a 2nd priority thread is selected.

Also, in cases #4 and #5, since in the next cycle an instruction of the 2nd priority thread is selected, the issue information isif has no valid information. For this reason, the issue information isnxt is generated and is used for the next cycle instead of the issue information isif. In case #4, the next next cycle is "all issue slots are occupied", so the issue information isnxt is 00. In case #5, the next next cycle is "2nd issue slot is empty", so the issue information isnxt is 01. In other cases, since in the next cycle also, the issue information isif has valid information, this is used.

In the latter case, the issue information isnxt generated in cases #4 and #5 is selected and latched, and becomes the next cycle issue information isid. As a result, the state of cases #2 and #3 of FIG. 14 is obtained, so the operation is identical to that of cases #2 and #3 of the former case. In the latter case, cases #4 and #5 do not occur.

The thread selection control signals thif0, thif1 are appropriately controlled by the aforesaid thread selection control logic, and issue slots which the 1st priority thread does not use are allocated to the 2nd priority thread.

FIG. 15 shows the operation of the processor 1 which issues an instruction of the 2nd priority thread by an empty issue slot of the 1st priority thread. Here, an example of loop operation is shown where the second program in FIG. 3 is executed as the 2nd priority thread by making use of an empty instruction issue slot when the first program shown in FIG. 1 is executed as the 1st priority thread, as in the example of FIG. 4. In this embodiment, on the 1st execution, issue information is generated and stored in the issue information buffer ISINF, and from the 2nd execution thereafter, an instruction of the 2nd priority thread is issued by an empty issue slot using the issue information. The first 6 cycles are first time executions, so the issue information is the initial value 00: "all issue slots are occupied at next cycle", the issue slot is allocated to the 1st priority thread and cannot issue an instruction of the 2nd priority thread.

In the 2nd loop, the issue information is updated, so the operation is as follows. In the 1st cycle, two instructions of the first program which is a 1st priority thread are issued. The issue information in the 1st cycle is 01: "2nd issue slot is empty at next cycle", and the in next cycle, an instruction of the first program which is a 1st priority thread is selected as the first instruction, while an instruction of the second program which is a 2nd priority thread is selected as the second instruction. However, both instructions are load store instructions, so execution resources conflict, and the 2nd priority thread instruction cannot be issued. In the 2nd cycle, the issue information is 11: "all issue slots are empty at next cycle and 2nd issue slot is empty at next next cycle", in the 3rd cycle, an instruction of the second program which is a 2nd priority thread is selected, and in the 4th cycle, the issue information is changed to 01, i.e., "2nd issue slot is empty at next cycle". The 3rd cycle of this 1st priority thread is the 1st cycle of the 2nd priority thread, and the 2nd priority thread is thereafter executed with a 2 cycle delay.

In the 4th cycle, the issue information of the 3rd cycle is 01, so as in the 1st cycle, the first program which is a 1st priority thread is selected as the first instruction, and the second program which is a 2nd priority thread is selected as the second instruction. However, both instructions are load store instructions, so execution resources conflict, and the 2nd priority thread instruction cannot be issued. The issue information of the 4th cycle is 00: "all issue slots are occupied at next cycle", so in the 5th cycle, two instructions of the first program which is a 1st priority thread are issued. The issue information of the 5th cycle is 10: "all issue slots are empty at next cycle", so in the 6th cycle, an instruction of the second program which is a 2nd priority thread is selected, and in the 1st cycle of the 3rd loop, the issue information is changed to 00, i.e., "all issue slots are occupied at next cycle". However, since both instructions are instructions other than load store and execution resources conflict, the 2nd instruction cannot be issued.

In the 1st cycle of the 3rd loop, since the issue information of the 6th cycle of the 2nd loop is 00, two instructions of the 1st priority thread are selected and issued as in the 1st cycle of the 2nd loop. Further, since the issue information of the 1st cycle is 01: "2nd issue slot is empty at next cycle", in the 2nd cycle, an instruction of the 1st priority thread is selected and issued as the first instruction, and an instruction of the 2nd priority thread is selected and issued as the second instruction. Here, the 1st loop of the 2nd priority thread is completed in 6 cycles. Thereafter, the 1st priority thread and 2nd priority thread are respectively executed in 6 cycles of 1 loop with a 2 cycle shift.

As mentioned above, according to this embodiment, an instruction of the 2nd priority thread can be issued using an empty issue slot of the 1st priority thread, and from the 2nd loop onwards, instructions can be issued as in FIG. 4 which assumes that thread selection is performed ideally. Also, IPC which was 1 in the example of FIG. 2, becomes about 1.7, so efficiency is largely improved.

Embodiment 2

The processor according to Embodiment 2 of this invention, the construction of the pipeline structure part and thread multiplexer are identical to that shown in FIGS. 12 and 13, except that compared with the processor 1, the issue information is 1 bit. In this embodiment, since issue information is 1 bit, the case where only the 2nd slot is empty cannot be used. Since two threads are not issued simultaneously, the control is therefore simpler.

Figures 16, 17:
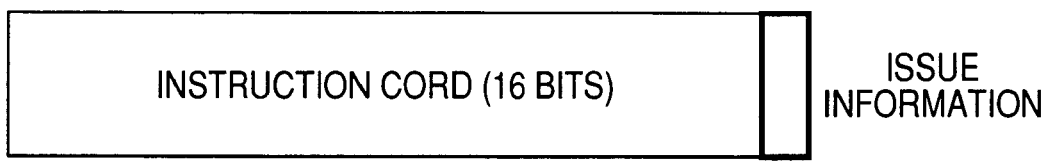
FIG. 16 is a diagram showing an example wherein 1-bit issue information is added to one instruction.
FIG. 17 is a diagram describing a thread selection control logic using 1-bit issue information.

FIG. 16 shows an example wherein 1-bit issue information is added to one instruction. The instruction length is 16 bits as in FIG. 11. The issue information encoding is 0: "all issue slots are occupied at next cycle", and 1: "all issue slots are empty at next cycle".

FIG. 17 shows the thread selection control logic using 1-bit issue information.

Two threads are not issued simultaneously, and an instruction of the same thread is always issued by the 1st and 2nd slot. Therefore, the values of the 1st and 2nd instruction thread selection signals thif0, thif1 are always the same. Case #1 is a case where the 1st instruction valid information opv0 is 0 and the thread selection signal thif0 is 0. As in FIG. 14, in the next cycle also, the 1st and 2nd instruction thread selection signals thif0, thif1 are both 0 so that an instruction of thread 0 which is a 1st priority thread is selected.

Cases #2 and #3 are cases where opv0 is 1 and the instruction is valid, or thid0 is 1 and the 2nd priority thread is selected. This condition can be exclusively classified as the case where opv0 is 1, the instruction is valid, thid0 is 0 and the 1st priority thread is selected, and the case where thid0 is 1 and the 2nd priority thread is selected.

In the former case, the issue information isif added to the 1st instruction opif0 of the 1st priority thread as issue information isid is selected. In this case, it is known from the encoding of FIG. 16 whether or not the 1st priority thread will next use an issue slot, so the 1st and 2nd instruction thread selection signals thif0, thif1 are judged as shown in FIG. 17. Specifically, in case #2, since the issue information isid is 0: "all issue slots are occupied at next cycle", in the next cycle, both the 1st and 2nd instruction thread selection signals thif0, thif1 are 0 so that the instruction of thread 0 which is a 1st priority thread is selected. In case #3, since the issue information isid is 1: "all issue slots are empty at next cycle", both the 1st and 2nd instruction thread selection signals thif0, thif1 are 1 so that the instruction of thread 1 which is a 2nd priority thread is selected.

In case #3, since an instruction of the 2nd priority thread is selected at the following cycle, there is no valid information in the issue information isif. For this reason, the issue information isnxt is generated and is used for the next cycle instead of the issue information isif. At the next cycle, all issue slots are occupied, so the issue information isnxt is 0. On the other hand, in case #2, the issue information isif has valid information at the next cycle also, so this is used.

In the latter case, the issue information isnxt generated by the aforesaid case #3 is selected and latched, and is the next cycle issue information isid. As a result, the state of case #2 of FIG. 17 occurs, and the operation is identical to that of the former case #2. In the latter case, case #3 does not occur.

The thread selection control signals thif0, thif1 are appropriately controlled by the above thread selection control logic, and the issue slot which a 1st priority thread does not use is allocated to the 2nd priority thread per cycle.

FIG. 18 shows the operation of the processor according to Embodiment 2 where an instruction of the 2nd priority thread is issued by an empty issue slot of the 1st priority thread. Here, as in the example of FIG. 15, this is an example of loop operation when the second program shown in FIG. 3 is executed as a 2nd priority thread by making use of an empty issue slot when the first program shown in FIG. 1 is executed as a 1st priority thread. In this embodiment, on the first occasion, issue information is generated and stored in the issue information buffer ISINF, and from the second occasion onwards, an instruction of the 2nd priority thread is issued by an empty issue slot by making use of the issue information. Since the first 6 cycles are first time executions, the issue information is 0: "all issue slots are empty at next cycle", so the issue slots cannot issue an instruction of the 2nd priority thread allocated to the 1st priority thread.

In the 2nd loop, the issue information is updated, so the operation is as follows. In the 1st cycle, two instructions of the first program which is a 1st priority thread are issued. The issue information at the 1st cycle is 0: "all issue slots are empty at next cycle", so in the next cycle also, an instruction of the 1st priority thread is selected. However, a 2nd instruction cannot be issued due to register conflict. The issue information in the 2nd cycle is 1: "all issue slots are empty at next cycle", so in the 3rd cycle, an instruction of the second program which is a 2nd priority thread is selected, and the issue information is changed to 0, i.e., "all issue slots are empty at next cycle". The 3rd cycle of this 1st priority thread is the 1st cycle of the 2nd priority thread, and thereafter, the 2nd priority thread is executed with a 2 cycle delay.

In the 4th cycle, the issue information of the 3rd cycle is 0, so as in the 1st and 2nd cycles, an instruction of the first program which is a 1st priority thread is selected. However, both instructions are instructions other than load store, so execution resources conflict, and a second instruction cannot be issued. The issue information for the 4th cycle is 0: "all issue slots are empty at next cycle" so in the 5th cycle, as in the 1st, 2nd and 4th cycles, an instruction of the first program which is a 1st priority thread is issued. The issue information for the 5th cycle is 1: "all issue slots are empty at next cycle", so in the 6th cycle, an instruction of the second program which is a 2nd priority thread is selected, and the issue information is changed to 0, i.e., "all issue slots are empty at next cycle". However, both instructions are instructions other than load store, so execution resources conflict, and a second instruction cannot be issued.

In the 3rd loop, as in the 2nd loop, the 1st priority thread is selected in the 1st, 2nd 4th and 5th cycles, and the 2nd priority thread is executed in the 3rd and 6th cycles. The operation of the 1st priority thread is identical to that of the 2nd loop. For the 2nd priority thread, since the 1st loop has not completed, the processing of the 7th cycle is performed in the 3rd cycle of the 1st priority thread. At this time, the instruction "mov r3, @r1" when escaping from an unbranched side loop is inserted in a second issue slot, but since the program has not escaped from the loop, issue is canceled. Thereafter, the 2nd priority thread enters the 2nd loop in the 6th cycle of the 1st priority thread.

As a result, the 1st priority thread is executed by one 6 cycle loop, and the 2nd priority thread is executed by one 9 cycle loop. Therefore, except for the 1st loop of the 1st priority thread for which issue information is not valid, the 1st priority thread can be executed 3 times and the 2nd priority thread can be executed 2 times in 18 cycles. In the execution of only the 1st priority thread, there are 18 instructions in 18 cycles, so IPC was 1, but according to this embodiment, 8 instructions of the 2nd priority thread are also executed, so IPC is about 1.4, and efficiency is significantly improved.

Embodiment 3

Figures 19, 20:
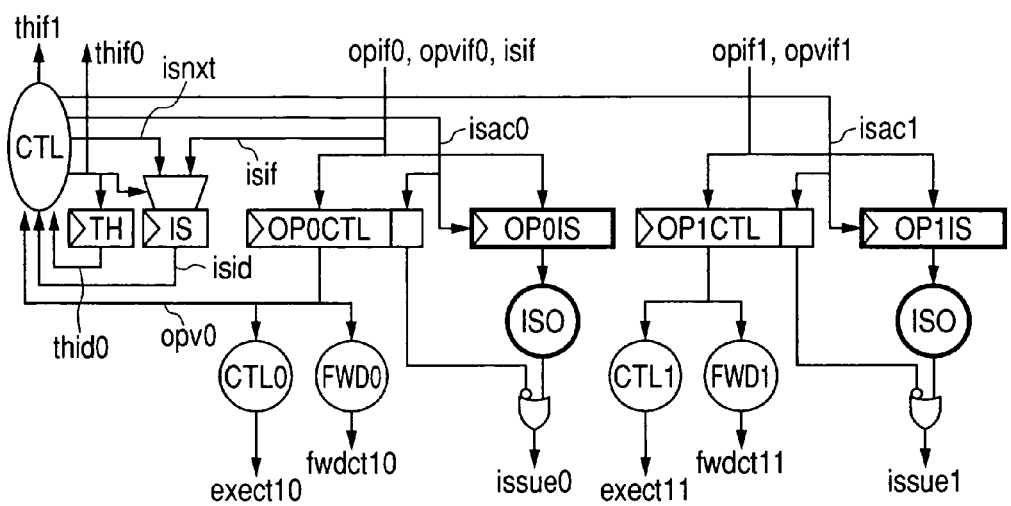
FIG. 19 is a diagram describing the construction of part of an instruction decoder IDU.
FIG. 20 is a diagram describing a thread selection control logic of a thread multiplexer CTL.

The processor according to Embodiment 3, as compared with the aforesaid processor 1, differs in the construction of the latch part of the instruction decoder IDU shown in FIG. 13. FIG. 19 shows the construction of part of the instruction decoder IDU. The input signals opif0, opvif0, isif, opif1, opvif1, and the output signals thif0, thif1 of FIG. 19, are identical to the signals of FIG. 13. In FIG. 13, the input signals opif0, opvif0, opif1, opvif1 are simply latched by the instruction decoder input latches OP0, OP1. On the other hand, in this embodiment, the 1st instruction opif0 and 1st instruction valid signal opvif0 are latched by two instruction decoder input latches OP0CTL, OP0IS. Similarly, the 2nd instruction opif1 and 2nd instruction valid signal opvif1 are latched by two instruction decoder input latches OP1CTL, OP1IS.

The input latch OP0IS is updated by the issue possibility judgment circuit activation signal isac0. If the issue information is valid and a 1st priority thread can be issued, an activation signal isac0 is 0, the activation signal isac0 is latched without updating the input latch OP0IS, the output of the issue possibility judgment circuit IS0 is forced by the latched signal, and outputs an issue signal issue0. In other cases, the activation signal isac0 is 1, the issue possibility judgment circuit IS0 is activated, and its output is the issue signal issue0. Here, in the case where the issue information is valid and the 1st priority thread cannot be issued, if the 1st priority thread is selected, it is known that the thread cannot be issued even without using the issue possibility judgment circuit IS0, but when the 1st priority thread cannot be issued, a 2nd priority thread is usually selected, so judgment by the issue possibility judgment circuit IS0 is required.

Even when issue possibility is known beforehand using issue information, an execution control information generation circuit CTL0 and operand forwarding information generation circuit FWD0 which are connected to the output of an input latch OP0CTL, output execution control information exect10 and forwarding information fwdct10, and control operand supply and instruction execution. Therefore, the output of the input latch OP1CTL which is an input signal for these generation circuits is updated even if the activation signal isac0 is 0. The aforesaid is the description of the circuit for the first instruction, but the circuit for the second instruction operates in an identical way.

FIG. 20 shows the thread selection control logic of the thread multiplexer CTL shown in FIG. 19. This thread selection control logic is similar to that of FIG. 14, but differs in that among the encoding of the issue information isid, 11 is allocated to "issue information invalid". Specifically, in the thread selection control logic shown in FIGS. 14 and 17, since the 1st priority thread can be executed when the issue information is invalid, the 1st priority thread is selected as "all issue slots are occupied at next cycle", and the issue possibility judgment circuit is always used. On the other hand, according to this embodiment, in the case of "issue information invalid", the issue possibility judgment circuits IS0, IS1 are activated, and an issue possibility judgment is performed. If the issue information is valid and "all issue slots are occupied at next cycle", it is clear that issue is possible, so the issue possibility judgment circuits IS0, IS1 are not used. Therefore, since it is necessary to distinguish these, in the encoding of FIG. 11, 11 is allocated to "issue information invalid".

As a result, the case 11: "all issue slots are empty at next cycle and 2nd issue slot is empty at next cycle" of FIG. 11 cannot be stored, and 10: "all issue slots are empty at next cycle" is used instead. Applying this difference to the operating example of FIG. 15, there is one case of 11: "all issue slots are empty at next next cycle and 2nd issue slot is empty at next cycle" at the 2nd cycle of the loop of the 1st priority thread, so this becomes 10: "all issue slots are empty at next cycle". As a result, it is not known whether the 2nd slot of the 4th cycle of the loop is empty, and an instruction of the 1st priority thread is therefore selected as the 2nd slot of the 4th cycle. However, in the example of FIG. 15, even if an instruction of the 2nd priority thread is selected, it cannot be executed due to resource conflict, so performance does not deteriorate. Moreover, it is considered that in other cases too, performance deterioration due to change of encoding is relatively small.

Now, the output signals thif0, thif1 and isnxt of cases #1 to #4 of the thread selection control logic of FIG. 20 are identical to those of FIG. 14, but there are the issue possibility judgment circuit activation signals isac0, isac1 as output signals which are not in FIG. 14. In cases #2 to #4 which have valid issue information, these signals have respectively the same values as the thread selection signals thif0, thif1. This is because, when the 1st priority thread is selected, the issue possibility judgment circuits IS0, IS1 are not activated. On the other hand, in case #1, since the issue information is invalid, the activation signals isac0, isac1 are 1, and the issue possibility judgment circuits IS0, IS1 are activated. In case #5 also, the issue information is invalid, so all the output signals are identical to those of case #1.

As described above, according to this embodiment, when the issue information is valid, the issue possibility of the 1st priority thread is clear even if an issue possibility judgment is not performed, so when the issue information is valid, the operation of the issue possibility judgment circuits IS0, IS1 can be suppressed. In recent years, due to superscalar or super pipeline configurations, resource conflict and operand conflict factors are increasing, and circuits which detect this to judge issue possibility are also becoming bulky. Hence, by suppressing the operation of the issue possibility judgment circuits IS0, IS1, power consumption can be reduced. To suppress operation of these issue possibility judgment circuits IS0, IS1, it is sufficient for example to stop the clock supplied to the latch part of the instruction decoder IDU, i.e., the clock supplied to a flip-flop from a clock driver, not shown. This power consumption reduction technique is effective for processors for all instruments ranging from portable devices to server systems and supercomputers.

Embodiment 4

The processor according to Embodiment 4 of the invention, compared with the aforesaid processor 1, differs in that 3 bits of a 32-bit instruction are used for issue information. Specifically, this issue information is not added to the instruction, but is entered in an instruction code. FIG. 21 shows an example where 3 bits of issue information have been added to the instruction code. The instruction length of the instruction code shown in this diagram is not particularly limited, but in this embodiment, it may be 32 bits. As for the issue information, empty issue slots are 000: "none", 001: "2nd 1 cycle later", 010: "1 cycle later", 011: "1 cycle later and 2nd 2 cycles later." There are also, 100: "1, 2 cycles later", 101: "1, 2 cycles later and 2nd 3 cycles later", 110: "1, 2 and 3 cycles later", 111: "1, 2, 3 cycles later and 2nd 4 cycles later." Therefore, issue information can be retained up to a maximum of 3.5 cycles and 7 issue slots.

According to this embodiment, the issue information is contained in the instruction code, so the issue information buffer ISINF shown in FIG. 12 included in the pipeline structure part of Embodiments 1 and 2 is not required. Therefore, the pipeline structure part has the general construction shown in FIG. 5, and the configuration of the thread multiplexer is identical to that shown in FIG. 13 of Embodiments 1 and 2.

FIG. 22 shows the thread selection control logic using 3 bit issue information. Since the issue information is encoded by 3 bits as shown in FIG. 21, the thread selection control circuit CTL performs 9 different controls as shown in FIG. 22. In case #1, issue information is invalid as in case #1 of Embodiments 1 and 2, and also in the following cycle the 1st priority thread is selected, so the thread selection signals thif0, thif1 are 0. The issue information isnxt may have any value *. Here, among the 8 modes where the remaining issue information is valid, case #9, which is 111: "issue slot after 1, 2, 3 cycles and 2nd after 4 cycles" with the most empty issue slots, will be described. Since the issue slot after 1 cycle is empty, the thread selection signals thif0, thif1 are 1. After 1 cycle, the empty issue slots decrease by 1 cycle, giving 101: "issue slot after 1, 2 cycles and 2nd after 3 cycles are empty", so the issue information isnxt is 101. Likewise, in cases #4 to #8, the thread selection signals thif0, thif1 are 1, and the issue information isnxt is a code where the empty issue slots decrease by 1 cycle. The operation of cases #2 and #3 is identical to that of cases #2 and #3 of FIG. 14 where the issue information is 2 bits.

As mentioned above, according to this embodiment, the issue information which was generated by the instruction decoder IDU which is hardware in Embodiments 1 and 2, can be generated by software such as a compiler when the instruction code is generated, and can be embedded beforehand. Further, in Embodiments 1 and 2, issue information which was valid from the 2nd execution, can be used from the 1st execution. For this reason, this embodiment is particularly effective when there is not much loop structure, there are few loop counts and the proportion of 2nd and subsequent executions is small. The issue information is 3 bits and encoding is performed as shown in FIG. 21, so even when the instruction issue interval is long, empty issue slots can be used effectively. For this reason, this embodiment is particularly effective when parallelism is low or there is a large amount of data waiting due to memory access.

Embodiment 5

The processor according to Embodiment 5 of the invention, compared with the aforesaid processor 1, differs in that to guarantee that execution of the 1st priority thread starts immediately, when there is a possibility that a thread whose priority is higher than the thread currently performed may arrive, the processor is put on hot standby without using one multithread. The processor according to this embodiment is a multithread processor which, as in Embodiments 1-4, can issue a 1st priority thread and 2nd priority thread. FIG. 23 shows hot standby execution by the processor according to Embodiment 5. In this operating example, during execution of the second program shown in FIG. 3 as the 2nd priority thread, after executing two leading instructions in the 1st cycle of the loop, execution of the first program shown in FIG. 1 is started as the 1st priority thread. Further, in this processor, issue information can be utilized from the first execution as in Embodiment 4. In this processor, only the 2nd priority thread is executed and the hardware for executing the 1st priority thread is not used, so execution of the 1st priority thread can start immediately.

Specifically, the program of the 1st priority thread executes 4 cycles of an initialization routine, and executes a loop in 6 cycles per loop. During 1st priority thread execution, an instruction of the 2nd priority thread can be executed by an empty slot using the issue information. Also, in this operating example, end processing of the 2nd priority thread is started using an empty slot. For example, in the 2nd, 3rd and 6th cycles of the loop of the 1st priority thread, the 2nd slot cannot issue an instruction due to load store resource conflict, but evacuation of the register which is end processing of the 2nd priority thread can proceed using the 2nd, 3rd and 4th cycles of the initialization routine, and the 1st, 4th and 5th cycles of the loop.

As described above, according to this embodiment, when there is a possibility that a thread whose priority is higher than that of the thread being executed may arrive, immediate execution of the thread with higher priority can be ensured by ending execution of the 2nd priority thread and placing the routine in the hot standby state again. Further, when there is a possibility that a thread whose priority is higher than that of the 1st priority thread which started executing may arrive, immediate execution of the thread with higher priority can be ensured by switching over so that the program which started execution by the 1st priority thread is executed by the 2nd priority thread.

Control System

Figure 24:
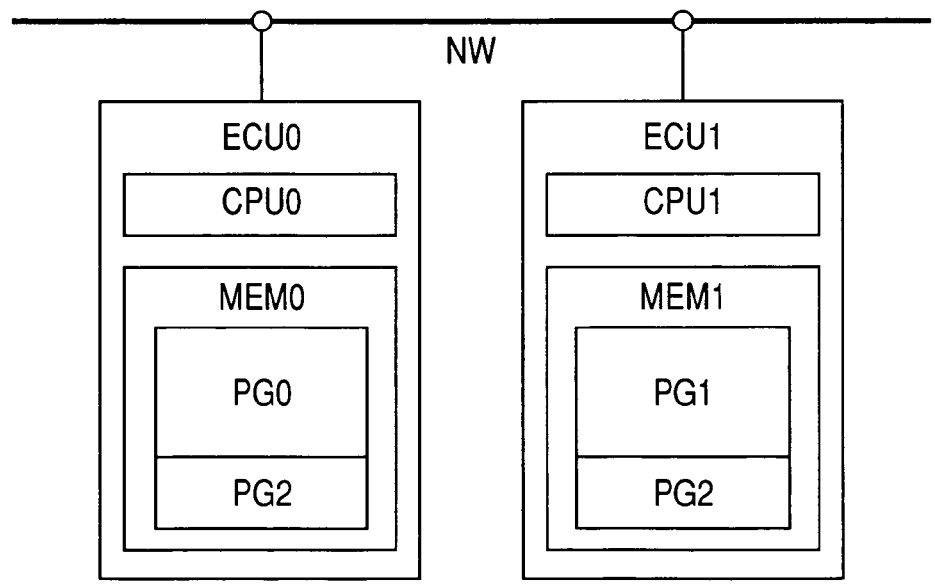
FIG. 24 is a diagram describing a control system using the processor according to any of the embodiments.

FIG. 24 shows the control system using the processor according to each of the aforesaid embodiments. The control system shown in this diagram is not particularly limited, but may for example be a vehicle system which performs control and information processing for a vehicle or the like. In this control system, two electronic control units ECU0, ECU1 are connected via a network NW. The electronic control unit ECU0 comprises a processor CPU0 according to any of the embodiments, and a memory MEMO. Programs PG0, PG2 mainly executed by the processor CPU0 are stored in the memory MEM0. On the other hand, the electronic control unit ECU1 comprises the processor CPU1 according to any of the embodiments, and a memory MEM1. The programs PG1, PG2 mainly executed by the processor CPU1 are stored in the memory MEM1. The program PG2 is actually a program which should be executed by the electronic control unit ECU0, but it is stored in both of the two electrical control units ECU0, ECU1, and its execution priority is lower than that of the programs PG0, PG1.

In the electronic control unit ECU0, if the high priority program PG0 is executed by the 1st priority thread, and the low priority program PG2 is executed by the 2nd priority thread by the processor CPU0, execution of the program PG2 can be performed while guaranteeing the execution time of the program PG0. However, in some cases, the program PG0 may be a program with a high degree of parallelity so that there is no remaining capability during execution, whereas the program PG1 being executed by the electronic control unit ECU1 is a program with a low degree of parallelity so that there is a large remaining capability.

In such a case, if the electronic control unit ECU0 which is the original processing unit requests processing by the electronic control unit ECU1 with a large remaining capability via the network NW, the program PG2 can be executed more rapidly. Hence, in this control system, execution of the program PG2 can also be performed while guaranteeing the execution time of the high priority program PG1. As a result, remaining capability is supplied and efficient distribution of load is attained between the two electronic control units ECU0, ECU1.

As mentioned above, according to this control system, since a processing request can be received from other electronic control units while guaranteeing response time, throughput can be increased. In particular, in a vehicle system, since various electronic control units which perform engine control, brake control and the car information system are connected by a car network, system-wide performance can be increased by providing the remaining capability of the electronic control units to other electronic control units and the car information system.

The invention designed by the Inventors has been described in detail based on the embodiments, but it will be understood that various modifications may be made thereto within the scope and spirit of the appended claims.

For example, in the processor according to Embodiment 5, when there was a possibility that a thread whose priority is higher than that of the thread currently performed will be received, the system was placed in the hot standby state, but here, the priority may also be judged by a prejudged interrupt control so that immediate execution of the thread having a higher priority is ensured.

Also, in the control system shown in FIG. 24, the program PG2 was stored in both the memories MEM0, MEM1 beforehand so that it could be executed by either of the electronic control units according to the situation, but the invention is not limited thereto. Specifically, when program transfer time does not present a problem but the capacity of the memory which stores the program does pose a problem, and processing is requested, the program can be forwarded to the electronic control unit which receives a processing request. This is because the electronic control unit generally has a memory capacity according to throughput, and even if there is no excess space to store programs which are not in use, sufficient space to store programs can be provided when they are in use.

What is claimed is:

1. A processor comprising an issue instruction multiplexer which decodes an instruction supplied to said issue instruction multiplexer, wherein:

said instruction has instruction issue information for the next and subsequent operating cycles after the operating cycle in which said instruction was issued;

said instruction has information showing the position of an operating cycle in which said instruction can be issued; and said instruction issue information is information generated on the first occasion of said instruction, or on the immediately preceding occasion it was executed.

2. The processor according to claim 1, further comprising an instruction cache which temporarily holds said instruction and an instruction issue information buffer which temporarily holds said instruction issue information, and said instruction issue information is read from said instruction issue information buffer together with said instruction read from said instruction information storage part.

3. The processor according to claim 1, wherein said instruction has a priority, said issue instruction multiplexer issues a high priority instruction to said operating cycle based on said instruction issue information, and issues a low priority instruction to a different operating cycle from said operating cycle.

4. The processor according to claim 3, comprising said issue instruction multiplexer with an issue possibility judgment circuit which judges whether or not to issue said instruction, and said issue possibility judgment circuit is inactivated when said high priority instruction can be issued.

5. A processor which executes plural threads simultaneously or by time division without save and restore of a processor state;

said plural threads have a priority; and when an instruction flow in a 1st priority thread is executed for the first time, the position of an operating cycle at which an instruction in said instruction flow can be issued is stored, and in the execution of a second and subsequent instruction flows, a 2nd priority thread is executed in a different operating cycle from said operating cycle, wherein said instruction has issue information generated on the first occasion of said instruction, or on the immediately preceding occasion it was executed.

* * * * *